United States Patent [19]

Gantzer et al.

[11] 4,244,163
[45] Jan. 13, 1981

[54] DEVICE FOR REDUCING THE WIDTH OF WINDROWS FORMED BY A MOWER

[75] Inventors: Jean-Paul Gantzer, Dannelbourg; Anton Werner, Saverne, both of France

[73] Assignee: Kuhn, S.A., Saverne, France

[21] Appl. No.: 15,738

[22] Filed: Feb. 27, 1979

[30] Foreign Application Priority Data

Mar. 10, 1978 [FR] France ................. 78 07925

[51] Int. Cl.³ .................. A01D 57/30; A01D 69/00
[52] U.S. Cl. ................................. 56/192; 56/13.6
[58] Field of Search ........................ 56/13.6, 192

[56] References Cited

U.S. PATENT DOCUMENTS

| 2,838,901 | 6/1958 | Daus | 56/13.6 |
| 3,696,598 | 10/1972 | Weichel | 56/192 |
| 4,037,390 | 7/1977 | Vogelenzang | 56/192 |

FOREIGN PATENT DOCUMENTS

| 2020293 | 7/1970 | France | 56/192 |
| 2317869 | 2/1977 | France | 56/192 |
| 383475 | 5/1947 | Japan | 56/13.6 |
| 1386631 | 3/1975 | United Kingdom | 56/192 |

Primary Examiner—Paul J. Hirsch
Attorney, Agent, or Firm—Young & Thompson

[57] ABSTRACT

The disclosure is of, in a mower which works over a great cutter width and comprises cutter discs or cutter drums or cutter belt pulleys or other rotary elements involved in the cutting operation, at least one device for reducing the width of the windrows comprising an endless flexible windrowing member which travels around two drums having substantially vertical axes of rotation, the first of said drums being approximately above one of said rotary elements at one extremity of the mower, the second of said drums being spaced to the rear of and nearer to the middle of the mower so that the windrowing member follows a path at an acute angle to the cutting front, at least one of said drums being driven at a speed different from that of said rotary elements so that the windrowing member impels cut fodder from a margin towards the middle of the windrow.

8 Claims, 3 Drawing Figures

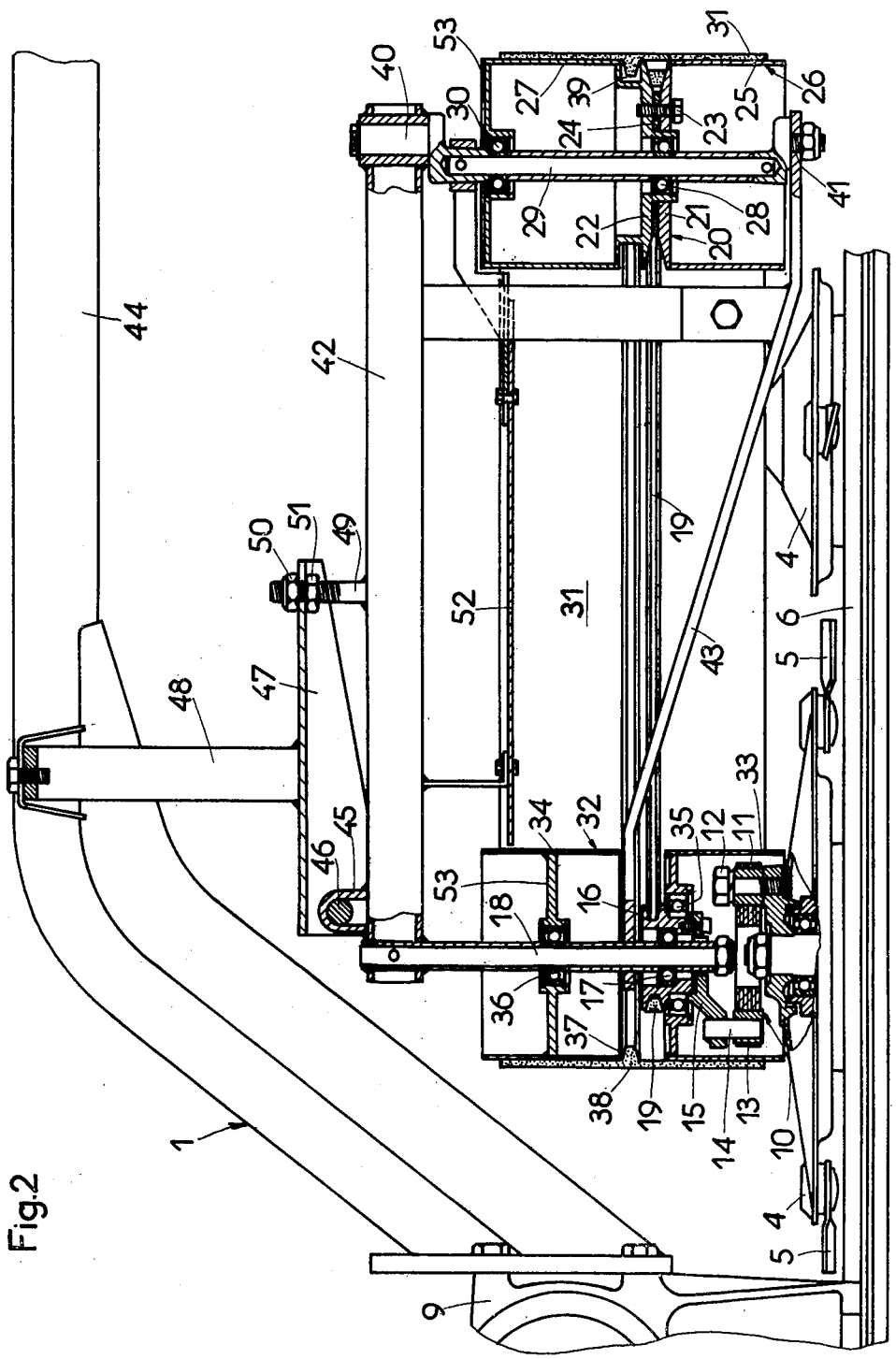

U.S. Patent    Jan. 13, 1981    Sheet 3 of 3    4,244,163
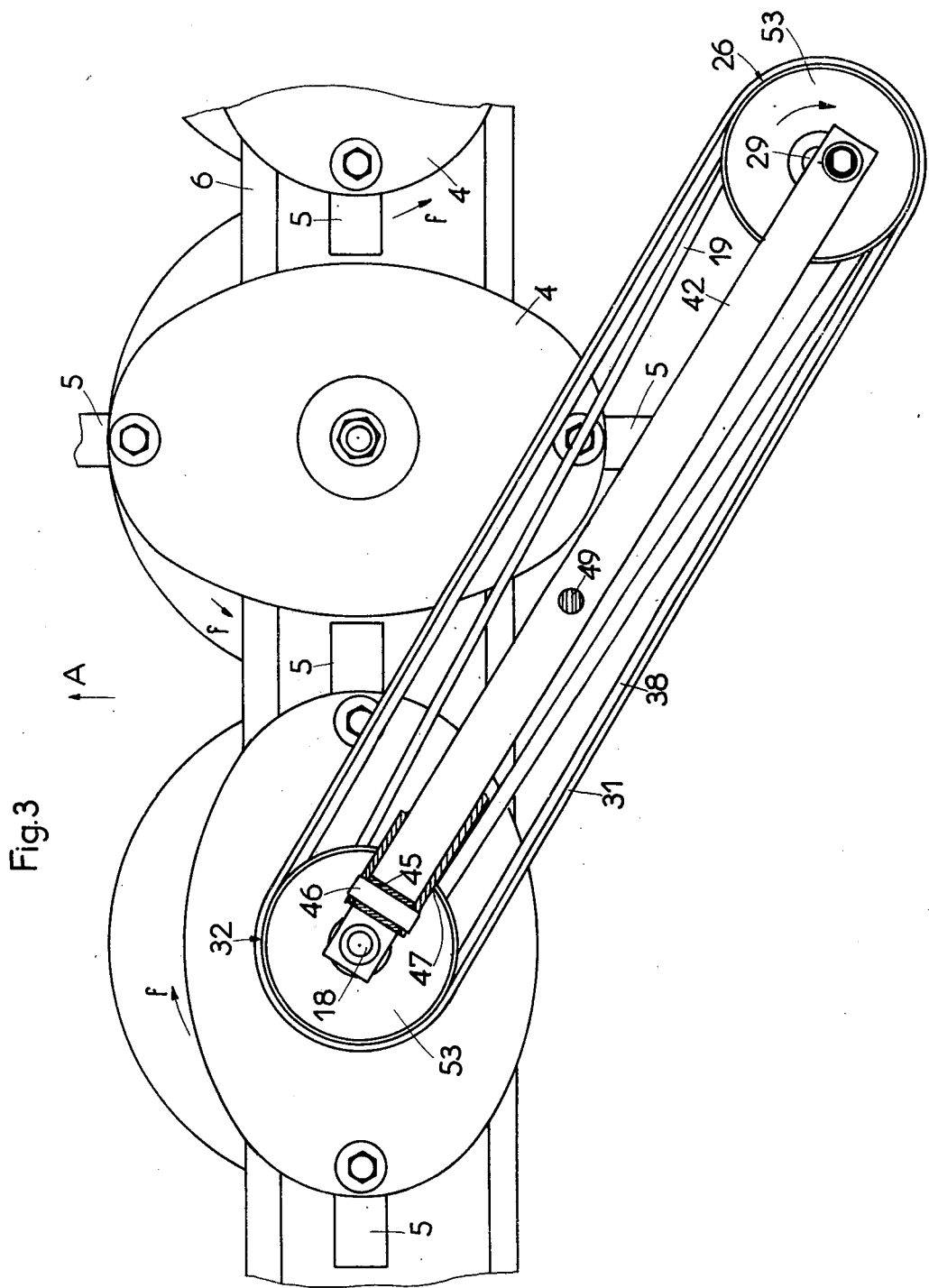

DEVICE FOR REDUCING THE WIDTH OF WINDROWS FORMED BY A MOWER

INTRODUCTION AND BACKGROUND OF THE INVENTION

The present invention relates to a device for reducing the widths of the windrow formed by a mower, for example a mower of the type comprising discs or drums or a belt equipped with cutting elements. These mowers may reach very great working widths and consequently form windrows which extend over great widths. Now certain agricultural machines, and especially forage harvesters, conditioners and balers for example, can handle only windrows the width of which is limited. It is thus often necessary to reduce the width of the windrows formed by mowers having great working widths, so that the fodder cut by these can be harvested conveniently.

To this end it has been proposed, especially on disc-type mowers, to install a drum at the level of the outer disc or discs of a mower. This single drum can be driven in rotation at a speed different from that of the discs, with the purpose of discharging the cut fodder towards the rear of the machine, while reducing the width of the windrow which it forms.

This arrangement displays the drawback of guiding the cut fodder over a maximum distance substantially equal to the diameter of the drum. Now the diameter of this drum is limited, otherwise it encroaches on the trajectory of the neighbouring discs, which would cause clogging phenomena harmful to the operation of a machine so equipped.

In order to increase the distance over which the cut fodder can be guided, with a view to the reduction of the widths of the windrows, then a windrowing band was used. This band passes over two drums, one of which is mounted coaxially on one of the discs of a disc-type mower. This position of the drum is in fact the most judicious so that the cut fodder may be drawn by a windrowing band passing over this drum . The said band likewise passes over a second drum the axis of which is parallel to that of the first. The second drum is located behind the discs so that the direction of the windrowing band forms an acute angle with the axes about which each of the discs rotates. The drive drum permitting the displacement of the windrowing band is fast with one of the discs. Now these discs rotate at speeds of the order of 3,000 r.p.m. Thus the drive drum is driven at the same speed. Thus the windrowing band moves very quickly, too quickly for the above-described device to function correctly since at this speed the band slips over the fodder without moving it as desired.

BRIEF SUMMARY OF THE INVENTION

The present invention has the purpose of reducing the widths of the windrows formed by a mower comprising discs, drums or a belt, which mower possesses a great cutting width, by the use of a windrowing band or belts passing over at least two drums of which one is situated approximately at the level of one of the rotating elements such as a disc, drum or pulley of a belt-type mower, but which rotates less quickly than the said rotating element.

This aim is achieved by reason of the fact that the device according to the invention comprises means situated within at least one of the drums to drive the windrowing band at a rotation speed different from, and advantageously lower than, the speed at which the aforesaid rotating elements rotate.

FURTHER DESCRIPTION AND ADVANTAGES OF THE INVENTION

This permits the band effectively to carry out its part as fodder conveyor, whereas when it ran too fast, as explained above, the fodder slipped over its surface without being able to be drawn. This likewise permits of reducing the power necessary to operate the machine, and of increasing the life of the said windrowing band.

The above-mentioned means comprise advantageously a coupling member connected for example to one of the end discs of a disc-type mower. This coupling member is provided with a pulley or the like over which there passes a belt driving a pulley of larger diameter. This second pulley is coaxial and connected in rotation with the drum extending behind the rotating elements of the mower. A windrowing band passes over the said drum and over a second drum the axis of rotation of which is the same as that of the coupling member.

According to another characteristic of the invention the drums and their drive mechanism are mounted on a chassis connected detachably to one of the chassis elements of the machine.

This permits the use of a disc-type, drum-type or belt-type mower with or without the device according to the invention which may be disposed at the one and-/or the other extremity of the machine or even at any location on the machine.

According to another characteristic of the invention the volume defined by the windrowing band or bands extending along the generatrices of the drums is closed. This avoids the penetration of fodder debris to the interior of the device according to the invention.

The invention will be explained in greater detail hereinafter in the following non-limitative description of an example of embodiment of the invention given with reference to the accompanying drawings.

BRIEF DESCRIPTION OF THE VIEWS IN THE DRAWINGS

FIG. 1 represents a perspective rear view of a disc-type mower equipped with a device according to the invention, FIG. 2 represents a sectional front view of the device according to the invention, FIG. 3 represents a plan view of the device according to the invention.

DETAILED DESCRIPTION OF THE PREFERRED EMBODIMENT

Figure 1:
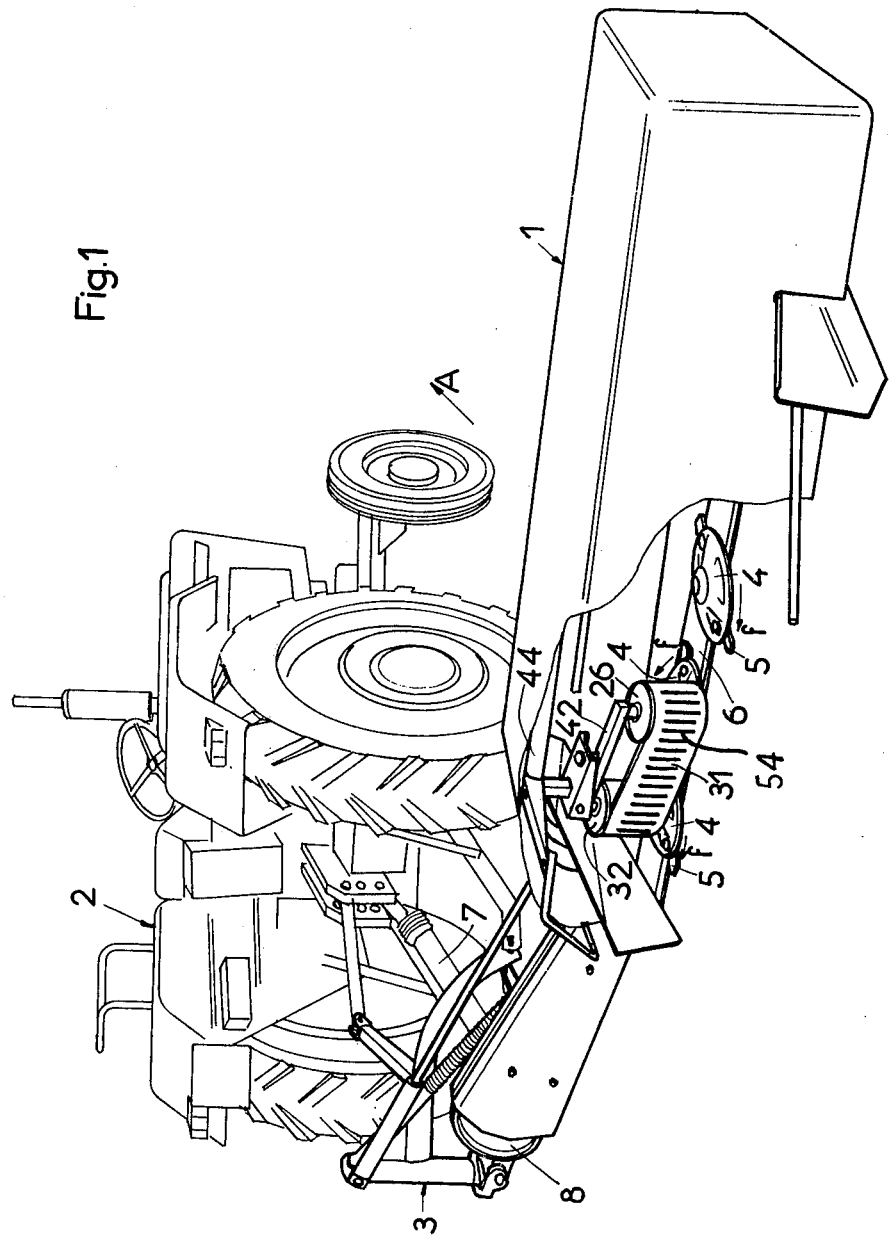

As represented in FIG. 1, the device according to the invention is applied to a bottom-driven disc mower. It is quite apparent that this device could equally be applied to a drum-type mower or a belt-type mower, without departing from the scope of the invention.

In FIG. 1 it can be seen that the disc mower 1 is hitched to a tractor 2 by means of a hitch device 3 of a well-known type. The disc mower 1 comprises discs 4 provided with cutting elements 5 which extend radially under the action of the centrifugal force when the discs are in rotation.

As shown by the arrows f, these discs are driven in rotation in opposite directions to one another at speeds of the order of 3,000 r.p.m. by means of transmission members located in a housing 6 situated beneath the discs 4. The said transmission members are operated by the power take-off of the tractor 2 and by further transmission members of known type such as a telescopic cardan shaft 7, grooved pulleys 8 over which belts pass, and a gear box 9.

From FIG. 1 it can be seen that the device according to the invention is provided on the left end side, if the machine is considered from the rear in the direction of its travel A. Without departing from the scope of the invention this device could likewise be mounted either on the right end side of the machine, or simultaneously on the left end and right end sides of the said machine. In the latter case the windrow would be gathered in line with the middle of the machine. This same device can equally be mounted in any region of the mower if the latter has for example a very great working width and it is desired to separate the windrow which it forms into several clearly mutually separated windrows.

In FIG. 1 it can also be seen that the device according to the invention extends in a direction forming an acute angle with the line joining the rotation axes about which each of the discs 4 rotates.

The device according to the invention will now be described in detail with reference to FIGS. 2 and 3 which show a front view in section through a plane passing through the middle of the said device and a plan view of this same device.

One of the discs 4 is provided with a coupling member 10. This member 10 comprises a female element 11 fast with the disc 4 and fixed thereon by three screws 12, only one of which is represented. This female element 11 likewise comprises holes 13 for the passage of pins 14 connected to the other element 15 of the coupling member 10. When the pins 14, only one of which is represented, are introduced into the holes 13 of complementary form of the female element 11, the latter is fast in rotation with the other element 15. The female element 11 is advantageously made of rubber or of elastic material, permitting especially of damping the vibrations.

On the other element 15 there is provided a pulley 16 guided in rotation by a ball bearing 17 mounted on a support shaft 18 extending above and in alignment with the rotation axis of the disc 4. A belt 19 passes over this pulley 16 which is of relatively small diameter. This belt 19 drives a second pulley 20 of greater diameter than that of the pulley 16.

The pulley 20 comprises two parts 21 and 22 assembled back to back by means of screws 23 with interposition of washer 24, so that the remaining space between the two parts 21 and 22 forms the groove permitting the passage of the V-belt 19, the tension of which can be regulated by modifying the thickness of the struts 24. This manner of regulation possesses the advantage of not affecting the tension of the windrowing band 31, which will be described in greater detail below.

The lower part 25 of the drum 26 is welded on the lower part 21 constituting the pulley 20, while the upper part 27 of the said drum 26 is welded to the upper part 22 of the pulley 20. Thus the belt 19 passes between the two parts of the drum 26.

This upper part 22 also ensures the rotational guidance of the pulley 20 by means of a ball bearing 28 mounted on a fixed shaft 29 parallel with the shaft 18. The guidance of the drum 26 is likewise ensured in its upper part 27 by means of a ball bearing 30.

A windrowing band 31 passes over the drum 26. This band also passes over the drum 32 rotating about the fixed axis 18.

Like the drum 26, the drum 32 is made in two parts, the lower part 33 and the upper part 34, between which the belt 19 passes.

The lower part 33 of the drum 32 is guided in rotation by means of a ball bearing 35 mounted on the hub of the smaller pulley 16, that is to say the lower part 33 of the drum 32 which is prolonged downwards to the level of the disc 4 is mounted freely in relation to the smaller pulley 16. Above the latter there extends the upper part 34 of the drum 32. This upper part 34 is guided in rotation by being mounted freely rotatably about the fixed shaft 18 by means of a ball bearing 36. The upper part 34 of the drum 32 terminates downwardly at 37 permitting the passage of an internal rib 38 on band 31. This rib is intended to ensure the holding of the windrowing band 31 on the drums 26 and 32. A recess 39 provided in the upper part 22 of the pulley 20 of the drum 26 permits the passage of this rib 38 over the said drum 26.

According to a preferred embodiment of the invention the pulleys 16 and 20 and consequently the belt 19 are situated as nearly as possible in the same plane as that in which the rib 38 of the windrowing band 31 extends. The necessary space between the lower and upper parts of the drums 26 and 32 is thus reduced to the minimum so as to ensure good retention of the windrowing belt 31.

The manner of operation of the device according to the invention is as follows: - When the disc 4 rotates, it drives the smaller pulley 16 at the same speed. The latter drives the pulley 20 through the intermediary of the belt 19. As the pulley 20 is larger than the pulley 16, there is a reduction of rotation speed of the pulley 20 and consequently of the drum 26 over which passes the windrowing band 31. As the said band 31 passes over the drum 32, it will drive the latter at a speed lower than that of the disc 4.

The fodder cut by this disc and the adjacent discs can thus be guided to the rear to form a windrow of reduced width without sliding over the windrowing band 31, as occurred when the drums rotate at the same speed as the discs.

According to this arrangement the drive drum is the drum 26, that is to say that situated behind the rotating elements 4 of the mower. Thus the tensioned run of the windrowing band is that in contact with the fodder for the purpose of its displacement towards the rear of the machine. The fact that it is the rear drum 26 which is the drive drum for the windrowing band 31 permits of increasing the diameter of the pulley 20 without detriment, in order to obtain a major reduction of rotation speed in relation to that of the discs, and consequently of reducing the speed of displacement of the windrowing band 31 in an appreciable manner.

Moreover since the untensioned run does not come into contact with the fodder, slapping of the said run has no effect upon the said fodder, this constituting a substantial advantage of the invention.

From FIG. 2 it can be seen that according to the invention it is easy to tension the belt 19 and the windrowing band 31. In fact the fixed shaft 29 of the drum 26 is of a kind of crank form, so that when it is rotated about its end journals 40 and 41 it is brought closer to or farther from the other shaft 18 and the belt 19 and the windrowing band 31 are slackened or tensioned. The journal 40 passes through a cross-member 42 connected to the shaft 18 of the drum 32, while the journal 41 passes through a strut 43 connected to the shaft 18 of the drum 32 above the pulley 16. This arrangement of the shafts 18 and 29 with the cross-member 42 and the strut 43 constitutes the chassis of the device according to the invention.

This chassis is detachably connected by the cross-member 42 to a chassis element of the machine, in the present case the principal carrier beam 44 of the guard of the disc mower. To this end the cross-member 42 comprises a lug 45 through which there passes a removable shaft 46 which further passes through the horizontal arm 47 of a part of inverted-T form. Its vertical arm 48 is fixed to the beam 44. At the other extremity of the horizontal arm there is provided a slot permitting the immobilising there of a threaded rod 49, welded to the cross-member 42, with the aid of a nut 50 and a locking nut 51. If it should not be desired to use the device according to the invention, the nuts 50 and 51 are slackened, the shaft 46 is withdrawn and by lifting of the said device the pins 14 are disengaged from their lodgement 13, permitting withdrawal of the device according to the invention.

According to a variant of embodiment of the device for attachment of the machine according to the invention the cross-member 42 can likewise be connected to the arm 47 with the aid of several threaded rods 49 passing through oblong holes provided in the said arm 47. Likewise the vertical arm 48 can be made in two parts united by bolts passing through oblong holes. Thus it is possible to adjust the device according to the invention in both a horizontal and a vertical plane.

According to a further characteristic of the invention it is possible to close completely the volume defined by the windrowing band 31, so that no fodder debris may penetrate into the space existing between the two drums 26 and 32. Thus this space can be closed in the downward direction for example by at least partially using the strut 43 which can advantageously be of a width slightly less than the diameter of the drums 26, 32. A plate (not shown) provided on the lower part of the device according to the invention can equally fulfil this blocking function. Likewise a plate 52 of form similar thereto can be provided in the upper part of the said drums 26, 32 so that no fodder debris may be introduced from above between the drums 26, 32 and the windrowing band 31. The drums 26 and 32 are likewise blocked at their extremities by means of covers 53.

According to a further detail of embodiment of the invention a deflector can be provided which extends from the cross-member 42 and even from the beam 44 to before the forward upper part of the windrowing belt 31. Thus even if the fodder is cut very high, there is no risk of fodder stalks passing over the device according to the invention. These stalks are pushed downwards to be entrained to the rear of the machine by the windrowing band 31.

Without departing from the scope of the invention it is likewise possible to replace the band 31 by windrowing belts. In order that the volume defined by said belts may nevertheless be sealed to fodder debris, vertical plates placed between the drums 26 and 32 and immediately behind the runs of the windrowing belts extend between the drums 26 and 32. In order to ensure good entraining of the fodder, the windrowing band 31 or the windrowing belts are advantageously notched towards the exterior, as shown at 54 in FIG. 1.

It is quite apparent that still further amendments, improvements or additions may be made in the example of embodiment as described above, without thereby departing from the scope of the present invention.

What is claimed is:

1. A device for reducing the width of the windrow formed by a mower comprising at least one rotating element having thereon cutting elements, the said device being located at least at one of the extremities of the mower and comprising:
    two drums over which pass windrowing means
    the first drum being situated approximately above one of the rotating elements
    the second drum extending, seen in the direction of travel of the mower, behind the first drum
    said second drum driving the windrowing means
    the lines joining respectively the axes of the two drums and the axes of the rotating elements forming an acute angle
    and transmission means disposed at least partially within said second drum to drive the windrowing means at a speed different from the speed at which the rotating elements rotate.

2. A device for reducing the width of the windrow formed by a mower of the type comprising at least one rotating element having thereon cutting elements, which comprises at least at one of the extremities of the mower two drums having a drive mechanism over which pass at least one windrowing member, the first drum being situated approximately above one of the rotating elements, the second drum extending, seen in the direction of travel of the mower, behind the first drum, the line joining the axes of the two drums forming an acute angle with the line joining the axes of the rotating elements, a speed reduction device comprising a coupling member having a first pulley over which there passes a belt driving a second pulley of diameter greater than that of the first pulley, the said second pulley being coaxial and fast in rotation with said second drum, while said at least one windrowing member passes over said second drum.

3. A device according to claim 2, wherein the drums and their drive mechanism are mounted on a chassis detachably connected to a chassis element of the mower.

4. A device according to claim 2, wherein each drum is made in two parts between which the belt passes.

5. A device for reducing the width of the windrow formed by a mower of the type comprising at least one rotating element having thereon cutting elements, which comprises at least at one of the extremities of the mower two drums over which pass at least one windrowing member, the first drum being situated approximately above one of the rotating elements, the second drum extending, seen in the direction of travel of the mower, behind the first drum, the line joining the axes of the two drums forming an acute angle with the line joining the axes of the rotating elements, a speed reduction device for the windrowing member comprising:-
    at least one pin connected to a first pulley and adapted to be introduced into a recess of said one rotating element,
    a belt passing over the first pulley and driving a second pulley of diameter greater than that of the first pulley, the said second pulley being coaxial and fast in rotation with said second drum said pulleys lying in a common plane, at least one windrowing member passing over the said drums, the said members having at least one guide rib situated in a plane parallel to said common plane, and means blocking the volume defined by said at least one windrowing member passing over the drums.

6. A device according to claim 5, wherein the means blocking the volume defined by said at least one windrowing member is constituted by plates situated in the immediate vicinity of said at least one windrowing member, at least one strut situated between the drums and the covers blocking the extremities of the drums.

7. A device according to claim 5, wherein said at least one windrowing member is constituted by a belt.

8. A device according to claim 5, wherein said at least one windrowing member is constituted by a band.

* * * * *